Dec. 31, 1957  R. EICHENAUER  2,818,080
COMPRESSED AIR TIRE-FILLING APPARATUS
Filed March 11, 1955  4 Sheets-Sheet 3

INVENTOR
Rudolf Eichenauer
By:
Attorney

United States Patent Office 2,818,080
Patented Dec. 31, 1957

2,818,080

COMPRESSED AIR TIRE-FILLING APPARATUS

Rudolf Eichenauer, Frankfurt am Main, Germany

Application March 11, 1955, Serial No. 493,696

14 Claims. (Cl. 137—224.5)

The present invention relates to automatic compressed-air filling apparatus and especially to apparatus for filling the tires of automotive vehicles, with compressed air. In a still more specific aspect the invention relates to compressed air tire-filling apparatus in which an electrical governing device controlled by air pressure, together with an intermittent out and in electrical switch, controls a magnetically activated valve which, in turn, controls the flow of the compressed air. I have already described an arrangement of this sort in my pending U. S. patent application Serial No. 362,327, filed June 17, 1953, which issued as Patent No. 2,788,795 on April 16, 1957.

The present invention relates to improvements on the subject matter of my prior application. In the apparatus of the present invention there are provided two electrical timers which operate with different time intervals. The apparatus operates to alternately supply compressed air to a tire and then to test the pressure of the air in the tire. A pressure gauge is, therefore, connected to the tire alternately with the compressor, or other source of supply of compressed air. The time interval for supply of air to the tire as compared with the time interval for testing is controlled initially by the timer with the long time period. As the pressure of the air in the tire rises, the indicator pointer of the gauge is advanced. When the pointer reaches a predetermined position, the timer with the long time interval is automatically cut out; and the timer with the short time interval takes control. Then there follow short intervals in which air is pumped into the tire alternating with quick tests to see if the pressure in the tire has reached the desired point. When the pressure in the tire has reached the desired amount the pointer of the gauge will have been advanced to a position where it automatically prevents further supply of compressed air to the tire until the apparatus is manually reset.

Figure 1:
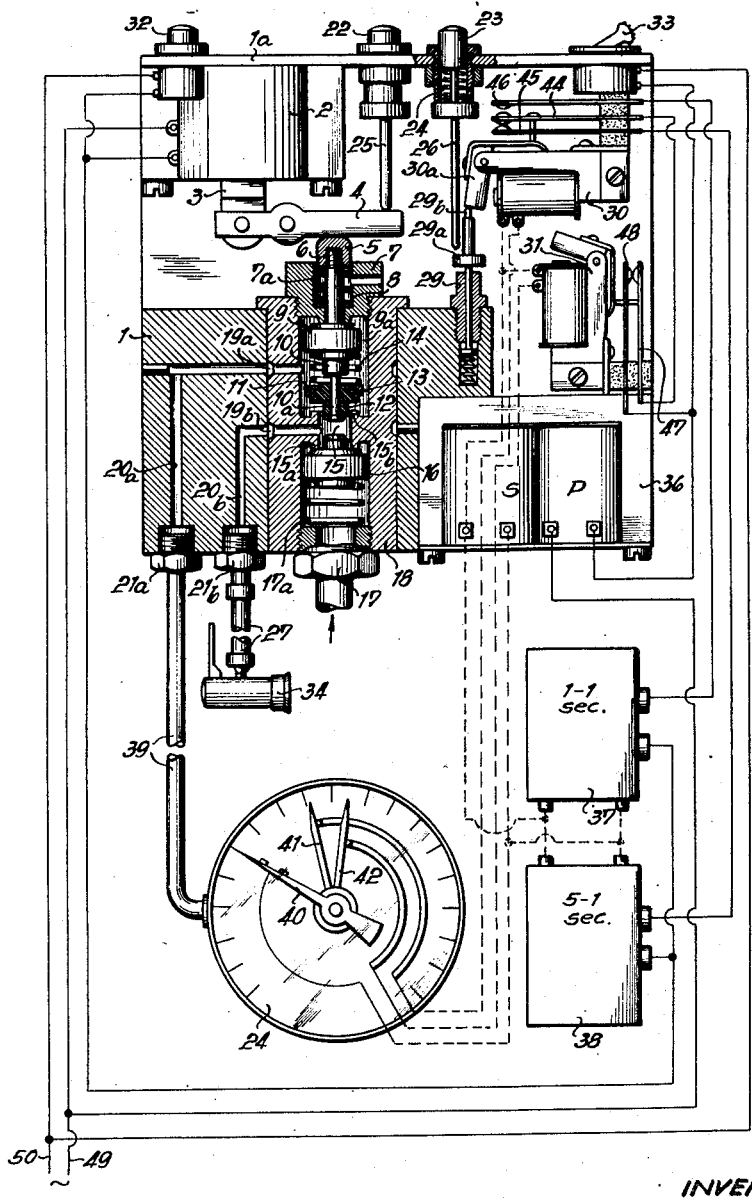
Fig. 1 is part elevation, part section of a tire-filling apparatus constructed according to one embodiment of this invention, the electrical connections being shown diagrammatically.

Referring first to the embodiment of the invention shown in Fig. 1, in the housing 1 there is an electromagnet 2 so fastened that in the withdrawal movement of the magnet armature 3 the pivoted lever 4, which is connected with the armature 3, presses on the head 5 of a valve 9. This head is threaded on the valve stem 6, which passes through the tubular nipple 7. The valve head 5 and stem 6 are constantly urged upwardly in Fig. 1 by a spring 8 which is located in a cylindrical recess 7a of the nipple 7 and which presses against the underside of the head 5, and which thus presses the upper face of the valve body 9 against a valve seat on the underface of the nipple 7.

On the other side of the valve body 9 is a cylindrical portion 10, from which extends the pin 10a to the lower end of which is riveted a head 12. A valve member 13 is mounted on pin 10a to slide thereon. This valve member is held in a plate 11 and is normally held against head 12 by pressure of the spring 14. The spring 14 is arranged between the two valve plates 9 and 13.

The nipple 7 is threaded into the sleeve 18 in which are provided the valve seats 15a and 15b, spaced axially somewhat below and above center, respectively. When the nipple 7 is fully threaded in, the valve plate 13 is a few millimeters from the valve seat 15b.

The valve body 16 is pressed against the valve seat 15a by a spring 17a which is disposed between this valve body and the nipple 17 that threads into the lower end of sleeve 18. The sleeve 18 has two axially-spaced grooves 19a and 19b around its periphery which communicate with radial ducts that extend inwardly into the upper hollow space 9a, and into the space 15, respectively. Space 15 is between the two valve seats 15a and 15b.

In the housing 1 there are longitudinal ducts 20a and 20b. These are connected through transverse ducts with the peripheral grooves 19a and 19b of the sleeve 18, which is threaded into the housing 1. These longitudinal ducts 20a and 20b connect to two tubular nipples 21a and 21b, respectively. A tube 39 connects the nipple 21a with the pressure gauge 24. The nipple 21b is connected by a hose 27 with the tire valve filling nipple 34. This filling nipple 34 is constructed in known manner, and has a pin for depressing and opening the check valve on the tire. Through the tubular nipple 17 the compressed air flows from the supply tank, into the tire, and through the nipple the tire can be vented.

Into the housing wall 1a there is threaded a press button 22 which is normally pressed outwardly by pressure of spring 7a. The button 22 terminates in a pin 25 which rests on the lever 4, so that by pressing the button 22 the lever 4 is moved so that the valve head 5 is pressed approximately about half way downwardly. Thereby the valve 9 is moved away from its seat on the nipple 7 without causing the valve 13 to close the other side of the opening 15. The button 22 is used in case it is desired to exhaust air from a tire. When valve 9 is moved off its seat by depressing button 22, compressed air can escape from the tire through nipple 34, hose 27, through the openings 15, 9a, and 7a, and out the radial discharge port in one side of nipple 7.

In the housing 1 there is a solenoid actuated single pole switch 30 and a solenoid-actuated out and in switch 31. Also mounted in housing wall 1a is an electrical switch which is put in circuit by inward pressure on the button 32 and is disconnected by spring pressure again. Finally there is in the housing a transformer whose primary P is supplied with power current and which produces through the secondary S a low voltage current for actuation of the relay switches 30 and 31.

A stop device cooperates with the single pole switch 30. This stop device consists of a pin 29b accommodated in the housing 29 and constantly urged upwardly by a spring acting on a head at its base to snap in over armature 30a when the armature 30a is drawn in by magnetic power. The pin 29b holds the armature 30a in the drawn-in position until the button 23 is pressed downwardly against the force of the spring 24 to cause the pin 26, which is connected to the button 23 to press on the collar 29a which is integral with the stop 29b, thereby to disengage the stop.

The contact pressure gauge 24 schematically illustrated possesses a pointer 40 which indicates the pressure flowing in the tube 39. This pointer has two contact plates connected together which are so positioned that they contact, respectively, opposed contact plates that are carried by but insulated from the manually adjustable contact pointers 41 and 42. The pointer 40 is connected with one side of the secondary spool S. The contact pointer 41 is connected with one pole of the magnetic spool of the switch 30; and the contact pointer 42 is connected with one pole of the spool of the out and in switch 31. The other pole of the secondary spool is connected with the two opposed poles of the spools of the switches 30 and 31 so that by contact of one contact plate on the pointer 40 with the pointer 41 the switch 30 is released, and by contact of the other contact plate of pointer 40 with the pointer 42 the switch 31 is released.

The armature 30a has an extension which engages a pin that is secured to switch blade 44. When the switch 30 is released, then, the armature 30a breaks the contact of the two opposed spring contact blades 44 and 46, but it closes thereby the contact between the spring contact blades 44 and 45.

The armature of the relay magnet 31 has an extension which engages a pin that is secured to flexible switch blade 47. When the pointer 42 is engaged by the opposed contact of the pointer 40 the circuit through the contact springs 47 and 48 will be broken and the relay 31 will be released.

The switches are shown in the drawings in the position of automatic actuation of the apparatus at the moment of the testing stroke. The current flowing through the line 50 flows through the closed switch 33, and the simultaneously closed electromagnetically operated switch 31 over the contact bridge of the flexible contact blades 44 and 45, a timing switch 38, through the spool of the electromagnet 2 and back by the line 49. The timing switch 38 at the moment illustrated has broken the circuit so that the pressure valve 16 is closed by action of the spring 17a so that the air pressure entering through the nipple 17 is held in check. Shortly thereafter the inlet valve 9 will be pressed by the force of the spring 8 against its seat on the nipple 7; and thereby the space 9a will be closed against free escape of air. The valve body 13 will also have been raised from its seat 15b.

After the lapse of the period, for which the timer is set, say a second, the automatic switch 38 closes the circuit to solenoid 2 so that now the magnet armature 3 is drawn in for a period, say five seconds, and thereby the valve head 5 will be pressed down. Through this the valve body 9 will be opened to venting position, and the valve body 13 will be pressed onto its seat 15b. The valve stem 10a then presses against the boss on the valve body 16 so that this is lifted from its seat, against the power of its spring 17a. The compressed air flowing from the compressor through the nipple 17 can now enter into the space 15 and through the bore 20b and the hose 27 can flow into the filling nipple 34. Since, however, the valve 13 is seated, and the valve 9 has been raised from its seat, the line 39 to the pressure gauge 24 will be vented to atmosphere through nipple 7. After expiration of the predetermined time, say five seconds, the automatic switch 38 will again break the circuit so that the described and illustrated position is again reached. Since the fill nipple 34 is still being pressed against the check valve of the tire, the air in the tire will now flow through the tubing 27 over the opening 15, the bore 20a and the duct 39 into the pressure gauge 24 and raise the pointer 40.

This alternating procedure continues until one of the contact plates on the pointer 40 contacts the contact plate of the adjustable pointer 41 and so closes the circuit between the secondary coil S and the magnetic spool of the magnetic switch 30. The armature 30a, which is then drawn in by magnetic power, is arrested by means of the quickly moving pin 29b which is moved by spring power. The current flowing through the line 50 now flows through the switches 33, 31 and the contact blades 44 and 46 to the timer 37 instead of to the timer 38. The timer 37 is set for a different period from timer 38, say one second. As a result the cycle time of five seconds is decreased to a second, so that the previously described procedure takes place in quicker sequence. The testing push or thrust takes place, therefore, at briefer intervals until the contact plate on the indicator 40 after a last brief testing thrust comes into contact with the contact plate on the pointer 42. Thereby the low voltage circuit between the secondary spool S and the magnetic spool of the switch 31 is closed. This causes the armature of the switch 31 to be drawn down, opening the spring contacts 47, 48. This breaks the circuit bridge to the magnet spool 2. The main valve 16 remains thus closed through contact of the contacts of the pointers 40 and 42 when the desired pressure produced in the tire indicated by the previous manual setting of the pointer 42 is attained. The primary coil of the transformer 36 is connected by the switch 33 with the lines 50 and 49. By actuating the rocking lever on the switch 33 the apparatus can be switched in and out.

In order also to make possible the hand actuation of the filling and testing apparatus an electric pressure switch which is actuated by button 32, is provided which connects the current flowing through the lines 50 and 49 directly to the magnetic spool 2.

Figure 2:
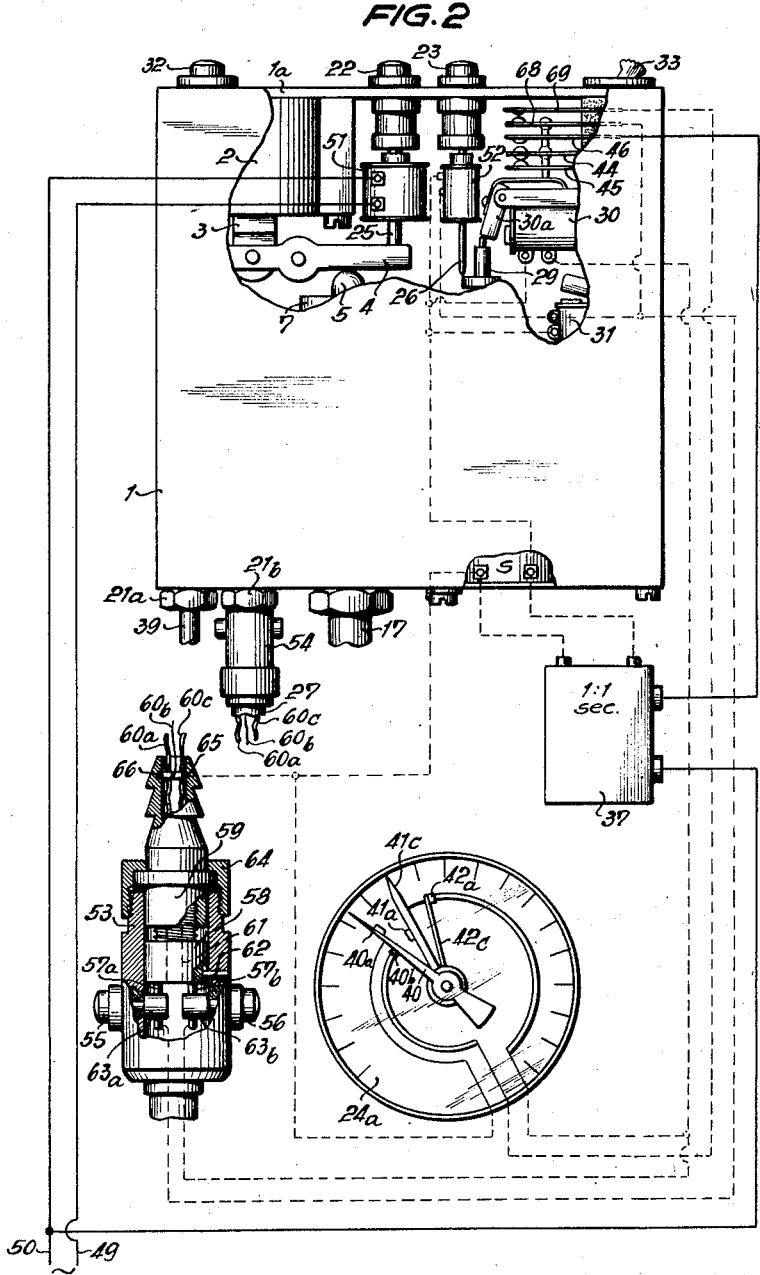
Fig. 2 is a part elevation, part section of a tire-filling apparatus constructed according to another embodiment of this invention, the electrical connections again being shown diagrammatically.

Fig. 2 shows a further embodiment of the invention. The apparatus shown in this figure is similar to that heretofore described, except for the differences which will be noted below. In Fig. 2 the releasing pin 26 is connected with a downwardly-pulling solenoid 52 actuated by the low voltage current. The adjustable contact pointer 41c of the pressure gauge 24a is coupled with a second contact carrier 42c. This contact carrier has a contact plate 42a for ascending indication, while the adjustable pointer 41c is provided with a contact plate 41a for descending indication. In order that the low voltage circuit controlled by the pointer 40a may influence the switch 31 when the pointer 40a is on its return movement, the low voltage circuit is broken in the at-rest position of the electromagnet 30. The electromagnet 30 is for that reason provided with an additional contact set 68—69 which is pressed into engagement upon actuation. Finally there is fastened on the pin 25 which serves to effect venting, an armature which is drawn inwardly by the electromagnet 51 when the current flows through this electromagnet.

In the tube 27 there is mounted a bored member 53. This bored member serves to house the electrical lead wires 60a, 60b and 60c for the two electrical pressure switches arranged on the bored member 53. The lines 60a and 60c are connected with the two pins 57a and 57b and carried through a cylindrical piece 58 made of insulating material. This cylindrical piece has on one end a thread with which it screws into the tubular nipple 59.

Between the contact pins 57a and 57b are one or more lengthwise ducts 61 arranged for passage of the compressed air. On the back of the cylindrical piece 58 is a slot in which the pin 62 engages and which secures the cylindrical piece against rotation. The contact heads 63a and 63b are insulated from and extend through the wall of the bored piece 53. They are provided with holes for the reception of the contact pins 57a and 57b. The tubular nipple 59 is connected with the threaded hollow piece 53 by means of the covering nut 64.

In the tubular nipple 59 there is a groove; and the spring ring 66 is pressed in this groove on which the bare conductor wire 60b is soldered. The wires 60a, 60b and 60c are carried through the tube 27 and are fastened with the tubular piece 54 on the valve housing 1 in the same manner as illustrated with respect to the hollow piece 53. By shoving the threaded cylindrical piece 58 produced from insulating material and threaded in the tubular nipple 59 into the hollow piece 53 the two pins 57a and 57b are clamped in the contact heads 63a and 63b.

These contact heads are connected with one terminal of the two pressure switches 55 and 56. The two opposed terminals of these pressure switches are both grounded to the hollow piece 53 which is connected by means of the conductor 60b, with the valve housing 1 through the spring ring which is pressed into the groove 65.

The purpose of the above-described structure is to make it possible to control all the operations of the apparatus from a position at the tire. The operator is not compelled at any time to run to and fro between the tire and the filling apparatus which is customarily mounted in fixed position on a column or wall. He only places the pointer 41c at the desired pressure value and presses the switch lever 33. Then he can by pressure on the button 55 close the low-voltage circuit to the spool of the switch 31, and through breaking of the high voltage circuit can stop the filling process.

After putting the filling nipple 34 (Fig. 1) on the tire he releases the button 55 and begins the filling of the tire in the manner previously described with reference to Fig. 1. The filling process continues with the short interruption every five seconds for testing until the maximum adjusted pressure somewhat over the desired pressure is attained. Then through engagement of the contacts 40a and 42a the relay 30 comes into action. Since the locking device 29 holds the armature 30a fast in poled position, the automatic timer 37 with the brief filling time will now be activated. Since the relay 30 however is not connected in this second embodiment of the invention with the magnetic spool 2 but with the electromagnet 51 of the venting apparatus 25, it will be this electromagnet that is actuated through the automatic switch 37 at brief intervals.

Through this process will the excess pressure be vented until the contact 41a is carried on the return movement of the pressure gauge indicator 40 into contact with contact 40b. It is important that through throttling the return motion of the pressure gauge indicator 40 takes place so slowly that there is sufficient time for the automatic out and in switching of the relay 37 to take place. Through the engagement of the contacts 40b and 41a the return motion of the pressure gauge indicator 40 the circuit to the electromagnet 51 of the venting apparatus is broken through the relay 31 and so the operation of the apparatus is stopped. The apparatus, however, operates immediately again in the described manner, however, if the pressure in the tire is higher than the adjusted value, and thereby the pressure gauge indicator 40 is again raised. In the disengagement of the contacts 41a and 40b, the circuit to the relay coil 31 is broken and thereby the electromagnet 51 is provided with current. This alternating procedure continues until the pressure in the tire holds the pressure gauge pointer 40 in one position in which the contact 40b remains in engagement with the adjustable contact 41a. The release of the detent 29 is attained through pressure on the stop button 56, because then the low voltage current is conducted to the magnet coil 52 by the contact 46. This action comes into question when a tire is filled beyond the adjusted pressure by hand apparatus. In changing the tire filling nipple 34 from one tire to another the compressed air valve 16 is held closed in the previously described manner by pressure on the button 55.

Figure 3:
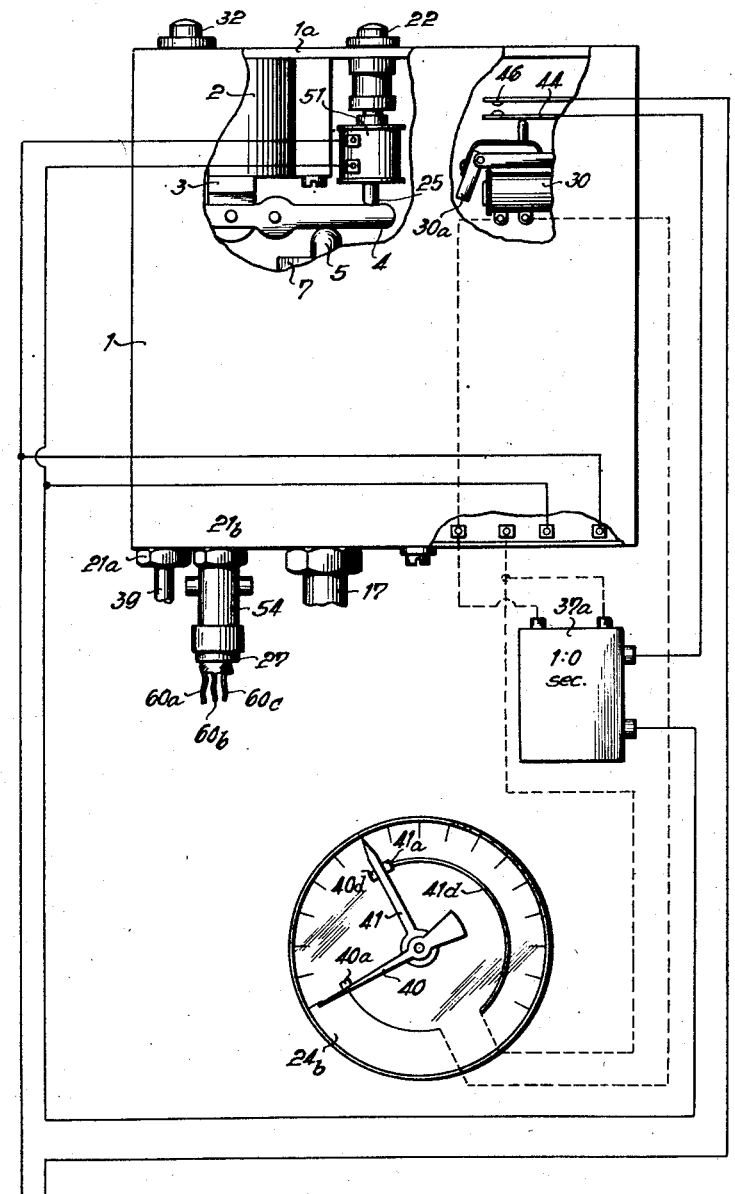
Fig. 3 is an elevational view with parts broken away, showing a still further embodiment of the invention, the electrical connections again being shown diagrammatically.

The simplified apparatus shown in Fig. 3 differs from the previously described apparatus in that filling takes place by pressure on the button 32 by hand, until the pressure indicated by the adjusting pointer 41 is exceeded. By closing the main compressed air valve 13 the pressure gauge pointer 40 is raised beyond the adjustable pointer 41. The contact plate 40a positions itself thereby against the contact plate 41a which in known manner slides on the contact rail 41d and carries it to the increased position. Upon contact of the contact plates 40a and 41a, the armature 30a of the relay 30 is pulled inwardly as described and the pressure circuit contact bridge 44—46 is closed. As a result of the retarding relay 37a the supply of current to the electromagnet 51 is retarded a second. This time is sufficient to bring the pressure gauge pointer 40 to the highest position. After expiration of the retarding time the vent becomes effective, since the electromagnet 51 presses the pin 25 downwardly and the valve head 5 (Fig. 1) acts in the previously described manner to bring about venting of the tire.

The retarded switching on of the venting apparatus is first effected when the pressure gauge pointer 40 has come to rest at its highest position. The time of the venting process is determined by the excess pressure in the tire, for the backward movement of the falling pointer 40 is longer or shorter in correspondence to the amount of the excess pressure in the tire. After the vent valve has opened in the described manner, the pressure gauge pointer 40 falls with both contacts 40a—41a until it meets on its return movement the adjustable pointer 41 and thereby the accompanying contact 41a is stopped in known manner at the adjustable pointer 41. Thereby the contact bridge 40a—41a is broken, the relay 30 is released, and the contact bridge 44—46 is opened. At this moment the vent valve closes because the circuit to the electromagnet 51 is also broken.

If the excess pressure in the tire is still higher, then the pressure gauge pointer 40 again rises over the adjustable pointer 41 and the venting process follows after expiration of the delay of a second in the same manner as described. The venting continues the longer, the higher the pointer has been raised, that is, the more excess pressure there is in the tire. If the excess pressure on the contrary in the tire is only very small, then the return movement of the pressure gauge pointer 40 and thereby also the time of venting is shorter. The apparatus comes finally to a stop when the venting has progressed so far that the pressure gauge pointer 40 can no longer bring contact plate 40a into contact with the contact plate 40d on the adjustable pointer.

Obviously also, instead of using hand operation, the automatic filling operation according to Fig. 1 can be combined with the last-described venting apparatus. The carrying out of the filling process in the last-described venting process takes place then by the first contact of the contact plates 40a—41a and is released by the closing apparatus 29a.

Figure 4:
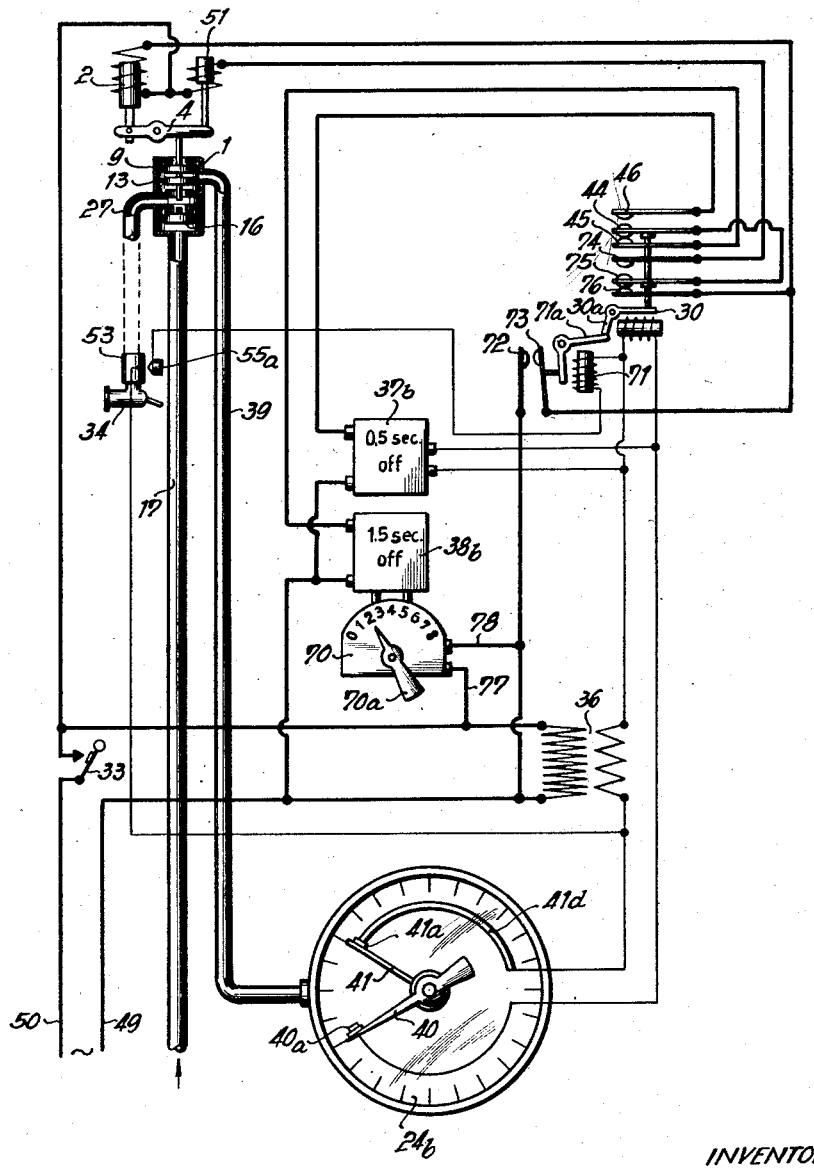
Fig. 4 is an elevational view, with parts broken away, showing diagrammatically a further embodiment of the invention.

Fig. 4 illustrates diagrammatically the combination referred to in the preceding paragraph. The electrical timer 37b with the short switching time for testing is actuated through the adjustable contact 41a when the contact 40a on the pointer 40 engages contact 41a. The low voltage current flows through this timer when said contacts are closed. The relay 30 is also actuated when these contacts are closed.

The armature arm 30a of the relay 30 is prevented from moving under actuation of the solenoid coil of this relay, and is disengaged by the armature 71a of the relay 71. The contact spring 73 of the relay 71 presses the armature 71a in the path of armature 30a. The relay 71 serves, therefore, as a stopping and disengaging device for the switches which are actuated by the relay 30.

The time intervals for supply of compressed air to the tire are adjustable by turning the arm 70a of the potentiometer 70 which controls the electrical timer 38b. This electrical timer is actuated by the high voltage current flowing through lines 77 and 78; and the time intervals are controlled in known manner by condensers.

By pressing the button 55a the relay 71 can be operated. This relay closes and opens the contact set 72, 73, and actuates the electromagnetically actuated air filling valve 2. The current flows through the contact set 75, 76 to the filling valve 2. If the relay 30 is actuated, the current flows through the contact set 74, 75 to the venting valve solenoid 51. Simultaneously, the circuit through the contacts 45, 44, and the contacts of the timer 38b is broken; and the circuit flows instead through the contacts 44, 46, through the timer 37b, because in the stopped position of the armature 30a, the contact 46 is connected to the contact 44 while the contact 44 breaks contact with the contact 45.

While the invention has been described in connection with several different embodiments thereof, it will be understood that it is capable of further modification, and this application is intended to cover various features and adaptations of the invention following, in general, the principles of the invention and including such departures from the present disclosure as come within known and customary practice in the art to which the invention pertains and as fall within the scope of the invention or the limits of the appended claims.

Having thus described my invention what I claim is:

1. Compressed air filling apparatus especially for automotive tires comprising two chambers, an air hose for conducting air from one of said chambers, a pressure gauge including indicating means, air-conducting means connected at one end to the other of said chambers and at its opposite end to said pressure gauge, a first valve controlling admission of compressed air from a source of supply to said one chamber, a second valve controlling connection of the two chambers, a third valve controlling venting of said other chamber, means for operating said three valves in sequence so that said first valve is first opened to connect said air hose to said source of supply of compressed air, then said first valve is closed and said second valve is opened to connect said air hose with the gauge, and then said second valve is closed and said first and third valves are opened to permit flow of compressed air again to said hose and venting of said gauge, two separate timing devices for controlling the time that said first valve is open in each cycle relative to the time it is closed and to the time that the second valve is open, one of said timing devices permitting said first valve to be open for a longer period than the other of said timing devices, and means whereby the indicating means of the pressure gauge renders said one timing device inoperative and renders said other timing device operative when the pressure gauge registers a predetermined pressure.

2. Compressed air filling apparatus especially for automotive tires comprising two chambers, an air hose connected at one end to one of said chambers for conducting air from said one chamber, a pressure gauge including indicating means, air-conducting means connected at one end to the other of said chambers and at its opposite end to said pressure gauge, a first valve controlling admission of compressed air from a source of supply to said one chamber, a second valve controlling connection of the two chambers, a third valve controlling venting of said other chamber, means for operating said three valves in sequence so that said first valve is first opened to connect said air hose to said source of supply of compressed air, then said first valve is closed and said second valve is opened to connect said air hose with the gauge to permit test of the pressure in said air hose, and then said second valve is closed and said first and third valves are opened to permit flow of compressed air again to said air hose and venting of said gauge, two separate timing devices for controlling the time that said first valve is open in each cycle relative to the time it is closed and the second valve is open, one of said timing devices permitting said first valve to be open for a longer period than the other of said timing devices, and means whereby the indicating means of the pressure gauge renders said one timing device inoperative and renders said other timing device operative when the indicating means registers a predetermined pressure, and means whereby said indicating means renders said other timing device inoperative also and stops the filling apparatus when said indicating means registers the desired pressure in the air hose.

3. Compressed air filling apparatus especially for an automotive tire, comprising an air hose for conducting air from said apparatus, a pressure gauge, means for alternately connecting the air hose to a source of compressed air supply and to the pressure gauge for alternately supplying air to said air hose and measuring the pressure therein, two timing devices for controlling the length of the time of connection of the air hose with said compressed air supply in each cycle compared with the length of the time of connection of the air hose with the pressure gauge, said timing devices permitting, respectively, different lengths of time of connection of the air hose with said compressed air supply, and means controlled by said pressure gauge for determining which of said two timing devices will be operative during the supply of air to said air hose.

4. Compressed air filling apparatus especially for automotive tires, comprising a chamber, an air hose for conducting air from said chamber, a first valve controlling connection of said chamber with a source of compressed air supply, a pressure gauge, a second valve controlling connection of said chamber with said pressure gauge, electrically-controlled means for alternately opening one valve and closing the other, two separate timing devices for controlling the time one valve is open in each cycle as compared with the time the other valve is open, and means operable under control of said pressure gauge for determining which of said timing devices is operative during supply of air to said air hose, said timing devices permitting said first valve to be open, respectively, for different lengths of time.

5. Compressed air filling apparatus for automotive tires, comprising a first chamber, an air hose for conducting air from said first chamber, means for connecting a source of compressed air supply to said chamber, a first valve adapted to be seated in one end of said first chamber to control said connection, a second chamber axially-aligned with said first chamber, a pressure gauge including indicating means, air-conducting means connecting said second chamber with said pressure gauge, a second valve controlling connection of the first and second chambers, a third valve controlling connection of said second chamber with the atmosphere to permit venting of said second chamber when said third valve is open, means normally urging said first valve to closed position to shut off the air hose from said source of compressed air supply, means for normally urging said second valve to open position to connect said air hose through the second-named air-conducting means with said pressure gauge, means for opening said first valve and for simultaneously closing said second valve and opening said third valve, two separate devices for controlling the length of time in each cycle that the first valve is open as compared with the length of time said first valve is closed and said second valve is open, one of said devices permitting said first valve to be open for a longer period of time in a cycle than the other of said devices, and means controlled by said pressure gauge for determining which of said timing devices is to be operative at a particular period.

6. Compressed air filling apparatus for automotive tires, comprising a first chamber, an air hose for conducting air from said first chamber, means for connecting a source of compressed air supply to said chamber, a first valve adapted to be seated in one end of said first chamber to control said connection, a second chamber axially aligned with said first chamber, a pressure gauge including indicating means, air-conducting means connecting said second chamber with said pressure gauge, a second valve controlling connection of the first and second chambers, a third valve controlling connection of said second chamber with the atmosphere to permit venting of said second chamber when said third valve is open, means constantly urging said first valve to closed position to shut off said air hose from said source of compressed air supply, means for constantly urging said second valve to open position and said third valve to closed position to connect said air hose through the second-named air-conducting means with said pressure gauge, means connecting said second and third valves so that they move together, means connected to said second valve for opening said first valve when said second valve is moved to closed position, means for periodically moving said second valve to closed position, and two timing devices for controlling the time of the periods during which said second valve is closed, one of said timing devices maintaining said second valve closed for longer period than said other timing device, and means operated by said indicating means when it reaches a predetermined position for rendering one of said timing devices operative and the other inoperative.

7. Compressed air filling apparatus for automotive tires, comprising a first chamber, an air hose for conducting air from said first chamber, means for connecting a source of compressed air supply to said chamber, a first valve adapted to be seated in one end of said first chamber to control said connection, a second chamber axially aligned with said first chamber, a pressure gauge including indicating means, air-conducting means connecting said second chamber with said pressure gauge, a second valve controlling connection of the first and second chambers, a third valve controlling connection of said second chamber with the atmosphere to permit venting of said second chamber when said third valve is open, means constantly urging said first valve to closed position to shut off said air hose from said source of compressed air supply, means for constantly urging said second valve to open position and said third valve to closed position to connect said air hose through the second-named air-conducting means with said pressure gauge, means connecting said second and third valves so that they move together, means connected to said second valve for opening said first valve when said second valve is moved to closed position, means for periodically moving said second valve to closed position, and two timing devices for controlling the time of the periods during which said second valve is closed, one of said timing devices maintaining said second valve closed for longer periods than said other timing device, and means operated by said indicating means when it reaches a predetermined position for rendering one of said timing devices operative and the other inoperative, and means operated by said indicating means when a desired pressure is reached to stop operation of the apparatus.

8. Compressed air filling apparatus for automotive tires, comprising a first chamber, an air hose for conducting air from said first chamber, means for connecting a source of compressed air supply to said chamber, a first valve adapted to be seated in one end of said first chamber to control said connection, a second chamber axially aligned with said first chamber, a pressure gauge including indicating means, air-conducting means connecting said second chamber with said pressure gauge, a second valve controlling connection of the first and second chambers, a third valve controlling connection of said second chamber with the atmosphere to permit venting of said second chamber when said third valve is open, means constantly urging said first valve to closed position to shut off said air hose from said source of compressed air supply, means for constantly urging said second valve to open position and said third valve to closed position to connect said air hose through the second-named air-conducting means with said pressure gauge, means connecting said second and third valves so that they move together, means connected to said second valve for opening said first valve when said second valve is moved to closed position, electrically-operated means for periodically moving said second valve to closed position, and two electrically-operated timing devices for controlling the time of the periods during which said second valve is closed, one of said timing devices maintaining said second valve closed for longer periods than said other timing device, means for locking said one timing device in operative position, and means operated by said indicating means when it reaches a predetermined position for disengaging said locking means and for rendering the other timing device operative.

9. Compressed air filling apparatus especially for an automotive tire, comprising an air hose for conducting air from said apparatus, a source of compressed air supply, a pressure gauge, means for alternately connecting said air hose to said pressure gauge and to said source of air supply, the means for connecting said air hose to said source of air supply comprising a first valve, a first electromagnet operable when energized to open said first valve, and a first timing device for controlling the length of time of opening of said first valve, a venting valve for connecting said air hose to atmosphere, means constantly urging said venting valve to closed position, a second electromagnet operable when energized to open said venting valve, an electric switch operable by said pressure gauge, said switch comprising a contact member adjustable to determine the amount of pressure required in said pressure gauge before said switch is closed, and a relay connected to and actuated by said switch, when said switch is closed to open a circuit to said first electromagnet and simultaneously to open the circuit to said first timing device and simultaneously to close a circuit to said second electromagnet and to said second timing device.

10. Compressed air filling apparatus according to claim 9 in which means is provided normally preventing operation of said relay, a second relay is provided for rendering the last-named means inoperative, and a manually operable electric switch is provided for closing a circuit to the last-named relay.

11. Compressed air filling apparatus according to claim 10 in which means is also provided operated by the first-named relay, when energized for opening said first valve to allow flow of compressed air from the air supply to said air hose.

12. Compressed air filling apparatus according to claim 11 in which manually operable means is provided for controlling the time intervals of supply of compressed air to said air hose.

13. Apparatus for inflating pneumatic tires, comprising an air hose for conducting air to and from said apparatus, a pressure gauge, an electro-magnetically-actuated air valve movable to one position to connect said air hose with a source of compressed air supply and movable to another position to connect said air hose with said pressure gauge so that alternately compressed air is supplied to the air hose and the air pressure therein is measured, two electrical timing devices operable successively for controlling the operation of said air valve, the first-operating timing device operating to hold said valve in its first-named position longer than the second-operating timing device, and means operated by said pressure gauge for rendering said first-operating timing device inoperative and for rendering said second-operating timing device operative when said pressure gauge registers a predetermined pressure.

14. Apparatus for inflating pneumatic tires according to claim 13 comprising means also for venting air from said pressure gauge when said air valve is moved to a position to connect said air hose with the source of compressed air supply.

References Cited in the file of this patent
UNITED STATES PATENTS

| | | |
|---|---|---|
| 2,568,086 | Nolde | Sept. 18, 1951 |
| 2,666,446 | Woodford | Jan. 19, 1954 |